July 16, 1968 F. S. INGRAHAM 3,393,274
SUBSCRIBER LOOP AND TRUNK LOOP RANGE EXTENSION CIRCUIT
Filed Dec. 18, 1964
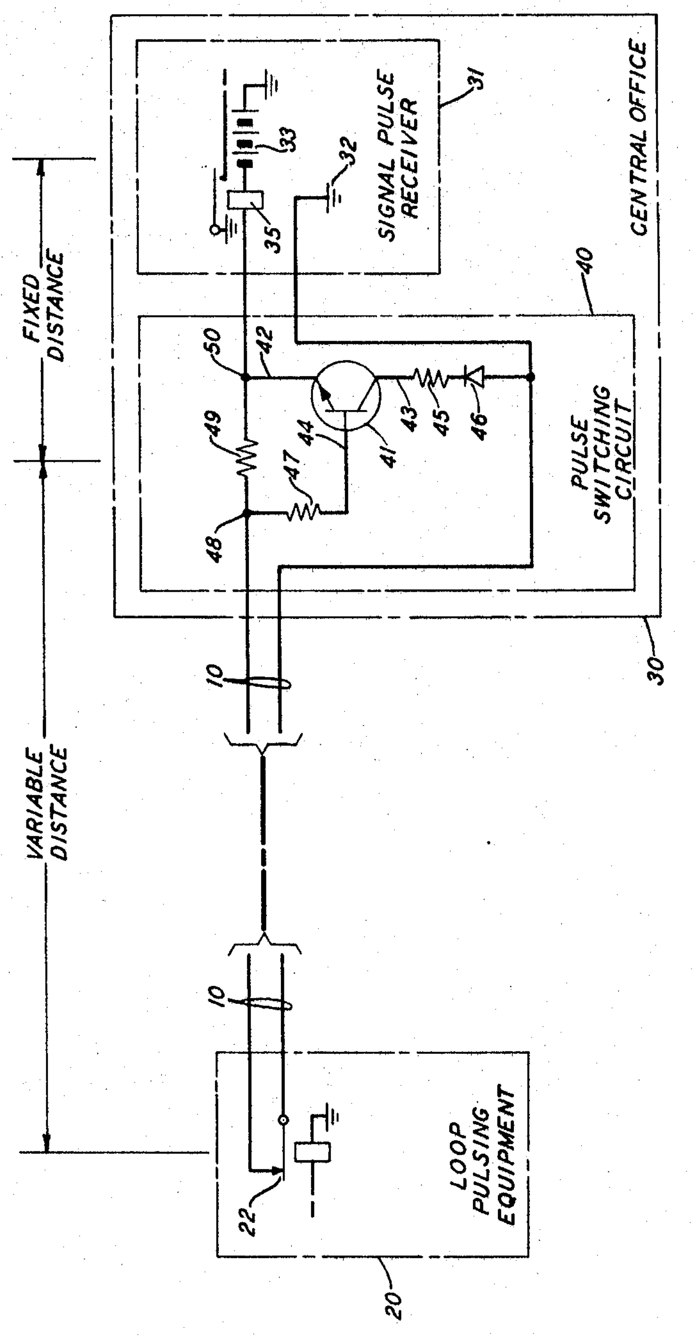
INVENTOR
F. S. INGRAHAM
BY John K. Mullarney
ATTORNEY United States Patent Office 3,393,274
Patented July 16, 1968

3,393,274
SUBSCRIBER LOOP AND TRUNK LOOP RANGE EXTENSION CIRCUIT

Frank S. Ingraham, Detroit, Mich., assignor to American Telephone and Telegraph Company, New York, N.Y., a corporation of New York
Filed Dec. 18, 1964, Ser. No. 419,409
4 Claims. (Cl. 179—16)

ABSTRACT OF THE DISCLOSURE

A transistor is used to operate the relay which receives pulsing and supervisory signals, in order to render the operating current independent of the length of the line.

This invention relates to the transmission of telephone supervisory signals over extended subscriber and central office trunk loops and, more particularly, to apparatus responsive to attenuated pulse type supervisory signals to thus extend the operative range of the same.

The range of supervisory signaling is limited in conventional telephone loop circuits by the attenuation of the level of the transmitted signals. If the loop is particularly long, the signals may be attenuated to a level at which they are no longer useful for their intended purpose. In the case of dial pulse supervisory signaling this entails the necessity of providing additional central offices to service a given area. Any economical means which extends the serviceable range of dial pulse supervisory signaling would of course facilitate more economical use of fewer central offices with a concomitant saving.

It is therefore an object of the present invention to extend the range of effective supervisory signaling in subscriber and central office trunk loops.

It is another object of the invention to reduce dialing errors because of the close adjustment limits of existing central office equipment.

It is yet another object to present a constant level signal to dial pulse receiving apparatus regardless of the range of the telephone lines.

It is still another object of the present invention to decrease equipment costs by reducing the number of central offices needed in a particular area by extending the range of the lines and/or trunk loop supervisory signaling.

In accordance with the present invention subscriber loop and central office trunk loop ranges are extended through the provision of supervisory signal regenerative apparatus at the remote receiving end of the loop. This regenerative apparatus comprises a switching transistor circuit having its collecttor-emitter path series connected with an energizing source and the winding of the relay to be operated in response to the supervisory signals. The base of the transistor is connected to one side of the subscriber or trunk loop. Normally the switching transistor is cut-off, for example, when the subscriber is on-hook. However, when the supervisory signaling condition is subsequently altered, e.g., when the subscriber goes off-hook, the switching transistor is turned on and thus provides a low conduction path via its collector-emitter path to thereby energize the series connected relay winding. In this manner a constant level of operating current is presented to said relay winding regardless of the length of the subscriber or trunk loop.

For a better understanding of the invention reference is made to the following detailed description and to the accompanying drawing. Various objects and features of the invention will be more fully apprehended from this detailed description and the single figure of which is a schematic diagram of one embodiment of the invention.

Referring now to the drawing, there is shown a subscriber or trunk line conductor pair 10 interconnecting the loop pulsing equipment 20 with a central office 30. The loop pulsing equipment 20 might typically comprise the dial pulsing equipment of a typical telephone set or a dial pulse sender of another, tandem connected, central office. The line conductor pair 10 may be one of several conductor pairs contained within a multiconductor cable.

Assume for illustrative purposes that the equipment 20 is located at a central office and that a subscriber in the vicinity of this central office is dialing a number to connect with another subscriber in the vicinity of central office 30. The dialing subscriber dials the number and the equipment at the central office records the dialed signaling data, which consists of a series of dial pulses, and applies the same, via the pulsing equipment 20, to the trunk line pair 10 for transmission to the central office 30. The various central office equipment utilized to perform this procedure is well known in the telephone art and it is not believed necessary to describe the same in detail.

The transmitted dial pulse supervisory signals are received by the signal pulse receiver 31 in central office 30 where they are typical utilized to operate switching equipment to interconnect the two subscribers; however, if the distance between the central offices is too great the signal pulse receiver may not function properly. It is well known that a transmission line contains distributed impedance which exists continuously from one end of the line to the other. This distributed impedance distorts and attenuates signals transmitted over the transmission line, and these adverse effects increase as the length of the line increases.

Now in accordance with the present invention a highly sensitive transistorized switching circuit 40 is inserted adjacent to the signal pulse receiver 31 at the central office 30. With the insertion of this switching circuit 40, the loop distance may vary considerably without adversely affecting the quality or effect of the supervisory signals received by the responsive equipment in the receiving central office 30.

The switching circuit 40 may comprise, as shown in the illustrative embodiment, an NPN transistor 41 including an emitter electrode 42, a collector electrode 43 and a base electrode 44. The collector-emitter path of the transistor 41 is shunted across the individual conductors of the transmission line pair 10. A current limiting resistor 45 and a current surge protective diode 46 are included in this shunt path. A biasing resistor 47 connects the base electrode 44 to node 48 on one of the conductors of the transmission line pair. A second biasing resistor 49 is inserted in the line itself between node 48 and node 50, which is connected to the emitter electrode 42.

The pulsing equipment 20 at the remote central office generates dial pulse supervisory signals by closing the symbolic relay contact 22. This completes a circuit path between ground 32 and the negative potential of source 33. The completing of this circuit results in the application of a positive pulse at the node 48 of the line pair 10. Now if the transmission line is quite long this pulse at node 48 may be insufficient to operate the relay coil 35 contained within the signal pulse receiver 31. This pulse signal, however, traversing the bias resistor 49 causes a potential drop to appear across the base-emitter junction of the more sensitive transistor 41 which biases it into a conducting condition. The collector-emitter path of transistor 41 thus becomes a new circuit path between ground 32 and the negative potential of source 33. Because this new circuit path is of a fixed electrical resistance, a constant level of operating current is presented to the relay coil 35 regardless of the length of the subscriber or trunk loop. The relay coil 35 so energized will operate additional equipment in central office 30 in a fashion well known in the telephtone art.

The biasing resistor 47 in the base electrode path precisely limits the magnitude of the base current. A current limiting resistor 45 is included in the collector-emitter path to control the precise amount of current that is needed to energize the relay coil 35.

At the termination of the particular supervisory signal pulse the relay contact 22, at the remote pulsing equipment 20, opens. This removes the signal pulse applied to the bias resistor 49. The transistor 41 is therefore no longer biased into a conducting condition, it thus cuts off and the constant current signal applied to the relay coil 35, via the collector-emitter path, is removed. A diode 46 inserted in the collector-emitter path of the transistor 41 protects the transistor from large reverse peak voltages during the periods of time the relay is de-energized.

It can be seen from the foregoing that current signals applied to the relay coil 35 will always be identical in amplitude and quality regardless of the distance between the two central offices. This is a distinct advantage and will permit greater distances between central offices and further permit each central office to service a larger subscriber area.

To illustrate a typical application of the invention, it was assumed that the loop pulsing equipment 20 comprised part of a remote central office and hence the conductor pair 10 comprises an interoffice trunk. It will be clear, however, to those skilled in the art that the pulsing equipment 20 may just as readily comprise part of the typical telephone subset. The requisite supervisory signaling (e.g., on-hook, off-hook, destination digits, et cetera) is transmitted in essentially the same manner, i.e., as direct current signals, to the local central office. The relay 35 may comprise the typical customer line relay, a line supervisory relay, a step-by-step selector switch "A" relay, et cetera. Accordingly, it will be clear that there are numerous applications and uses of the principles of the present invention in the telephone field.

While an NPN junction switching transistor has been shown in the drawing, it will be clear that transistors of the other conventional types may be used, with only minor and straightforward circuit changes required. Accordingly, it is to be understood that the foregoing disclosure relates to only a preferred embodiment of the invention and that numerous modifications or alterations may be made therein without departing from the spirit and scope of the invention.

What is claimed is:

1. In a telephone system, loop pulsing means for transmitting pulse type supervisory signals, a central office remote from said loop pulsing means including relay means operative in response to received supervisory signals of a given magnitude, an extended loop circuit connecting the loop pulsing means to the central office for operating said relay means in response to transmitted supervisory signals, said loop circuit comprising a pair of conductors, a switching circuit comprising a transistor having emitter, collector and base electrodes, the collector-emitter path of said transistor being connected in a series loop with said relay means and a source of energizing potential, and means connecting the base of said transistor to a predetermined one of said pair of conductors for biasing the transistor to a normally nonconducting condition, said tarnsistor being rendered conductive by low level supervisory signals to provide a low conduction series path for said relay means via the collector-emitter path.

2. A telephone system as defined in claim 1 wherein the transistor is rendered conductove by supervisory signals of a magnitude less than said given magnitude.

3. A telephone system as defined in claim 2 including diode means connected in said collector-emitter path with a poling that presents a low impedance to the current flow resulting from transistor conduction.

4. In a telephone system, a first central office, a second central office, supervisory signal transmitting means at said first central office, supervisory signal receiving means at said second central office, a pair of conductors interconnecting said supervisory signal transmitting means and said supervisory signal receiving means, said supervisory signal receiving means including signal regenerative means and signal utilization means, said signal utilization means and said signal regenerative means separated by a fixed electrical distance, said signal utilization means operatively responsive to signals from said signal regenerative means and said signal regenerative means operatively responsive to signals applied thereto by said conductor pair and biased to respond to signals insufficient to independently operate said supervisory signal utilization means, said signal regenerative means comprising an NPN transistor having collector, emitter and base electrodes, one conductor of said conductor pair connected to apply said signal to an electrical node between said base and emitter electrodes, the collector-emitter path of said transistor being shunted across the individual conductors of said conductor pair, said transistor being biased to be rendered conductive in response to said signal and said signal utilization means comprising a series connected relay coil and potential source on one of said conductor pairs and a reference potential in the other conductor of said conductor pair, and unidirectional current flow means in said collector-emitter path to protect said transistor from reverse voltage surges.

References Cited

UNITED STATES PATENTS 3,111,558 11/1963 Proctor ---------- 179—16.5

WILLIAM C. COOPER, *Primary Examiner.*